Figure 1:
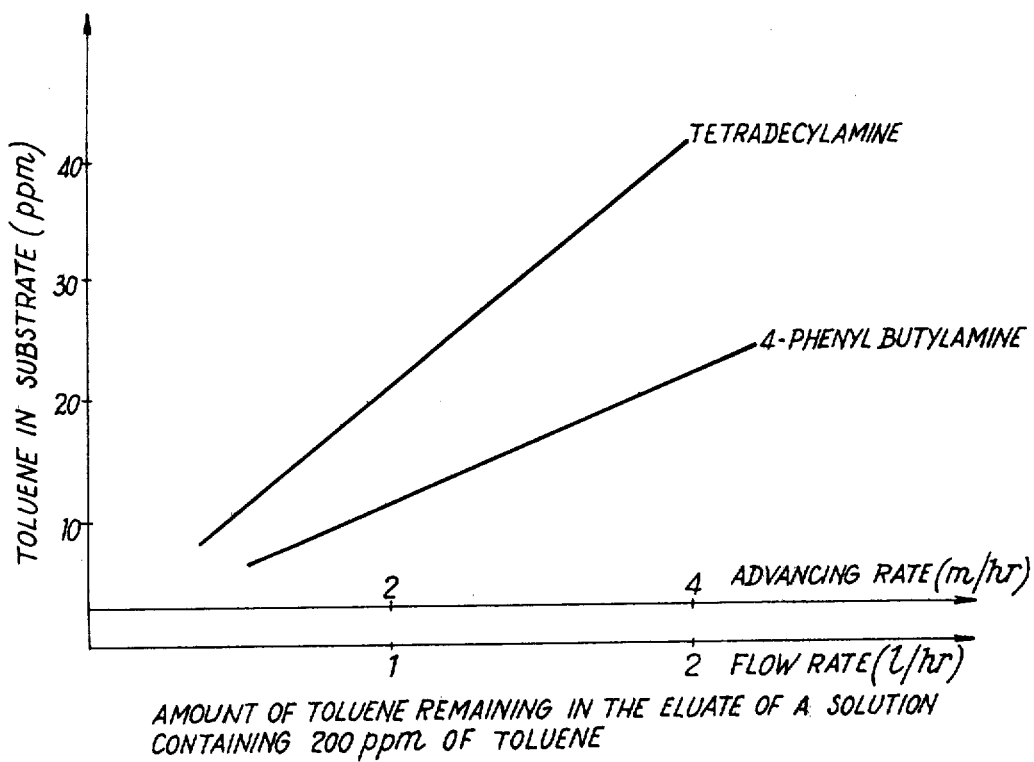

United States Patent [19]

Durand et al.

[11] 3,901,818

[45] Aug. 26, 1975

[54] HYDROCARBON BINDING COMPLEX AND PROCESS FOR ITS PREPARATION

[75] Inventors: Gilbert Durand; Alain Pareilleux; Gérard Goma; Pierre Monsan, all of Toulouse, France

[73] Assignee: Creusot-Loire, Paris, France

[22] Filed: Nov. 16, 1973

[21] Appl. No.: 416,575

Related U.S. Application Data

[63] Continuation-in-part of Ser. No. 228,721, Feb. 23, 1972, abandoned.

[30] Foreign Application Priority Data

Mar. 1, 1971 France .......................... 71.07851

[52] U.S. Cl. ............. 252/184; 106/308 N; 210/36; 210/40; 252/179; 252/428; 252/430
[51] Int. Cl.² ................... C01B 31/16; B01J 31/22
[58] Field of Search ........... 252/184, 179, 428, 430; 210/30, 36, 40; 106/408 N

[56] References Cited
UNITED STATES PATENTS 3,152,084   10/1964   Middlebrooks .................... 252/184

FOREIGN PATENTS OR APPLICATIONS 1,139,499   11/1962   Germany .......................... 252/184

Primary Examiner—Benjamin R. Padgett
Assistant Examiner—Irwin Gluck
Attorney, Agent, or Firm—Young & Thompson

[57] ABSTRACT

The invention concerns solid complexes for binding hydrocarbons and a process for their preparation.

Said complexes are formed by an amine bound to a substrate (clay, glass, organic polymer) through a binding reagent which is an acid chloride. To prepare the complexes, the amine is reacted with the previously activated substrate and becomes covalently bound thereto. The hydrocarbons and other organic materials are bound to the amine by a hydrophobic linkage. Proteins may also be bound to the complex by means of a hydrophobic linkage. The complexes according to the invention are useful in the purification of waters containing hydrocarbons, in the analysis of hydrocarbons, in the separation of proteins, etc..

23 Claims, 2 Drawing Figures

AMOUNT OF TOLUENE REMAINING IN THE ELUATE OF A SOLUTION
CONTAINING 200 ppm OF TOLUENE

INFLUENCE OF AROMATIC HYDROCARBON SOLUBILITY ON THE
SUBSTRATE ACTIVITY

HYDROCARBON BINDING COMPLEX AND PROCESS FOR ITS PREPARATION

This application is a continuation-in-part of our application Ser. No. 228,721 filed Feb. 23, 1972, and now abandoned.

This invention relates to new complexes for the adsorption of hydrocarbons or other organic materials. It is also concerned with a process for the preparation of such complexes.

A process for the preparation of solid enzyme complexes, particularly of hydrolase complexes, with inexpensive substrates has already been described, said complexes being readily prepared and exhibiting increased stability to a variety of denaturing agents.

It is known, on the other hand, that proteins may bind hydrocarbons by means of hydrophobic linkages.

Covalent binding of non-enzymatic proteins and of compounds simpler than proteins, such as amines, has now been studied.

Therefore, the present invention contemplates the preparation, in an easy and rapid manner, of a substrate for the purpose of binding hydrocarbons or other organic materials.

Certain processes currently employed to separate hydrocarbons from water make use of porous or powdered materials such as sands, clays, charcoal, talc, wood sawdust or plastic materials such as some polyurethanes. These are primarily adsorption phenomena which lead to the binding of a limited amount of hydrocarbons.

According to the present invention, substantially greater amounts of hydrocarbons or other organic materials may be bound to a complex than was possible with the prior processes. The hydrocarbon or other organic material thus bound is then readily recovered; the substrate is thus readily regenerated and ready for a new binding cycle.

This invention relates to a solid complex for the purpose of binding hydrocarbons and other organic materials, consisting essentially of a solid substrate bearing free hydroxyl groups activated with from 0.01 to 10 parts by weight of an acid halide per one part of said substrate and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbon atoms bearing the amine group.

The invention relates also to a process for the preparation of the aforesaid complex, comprising suspending said substrate in a solution of the acid halide in an organic solvent, separating the resulting activated substrate, washing the activated substrate with an organic solvent, suspending the washed activated substrate in an aqueous or organic solution of the primary amine and isolating the resulting solid complex.

According to another aspect, the invention relates also to a process for the preparation of the aforesaid complex, comprising contacting said substrate with a vapor of said acid halide, entraining the excess vapors with an inert gas, then sweeping the activated substrate with a vapor containing said amine and collecting the resulting solid complex.

Figure 2:
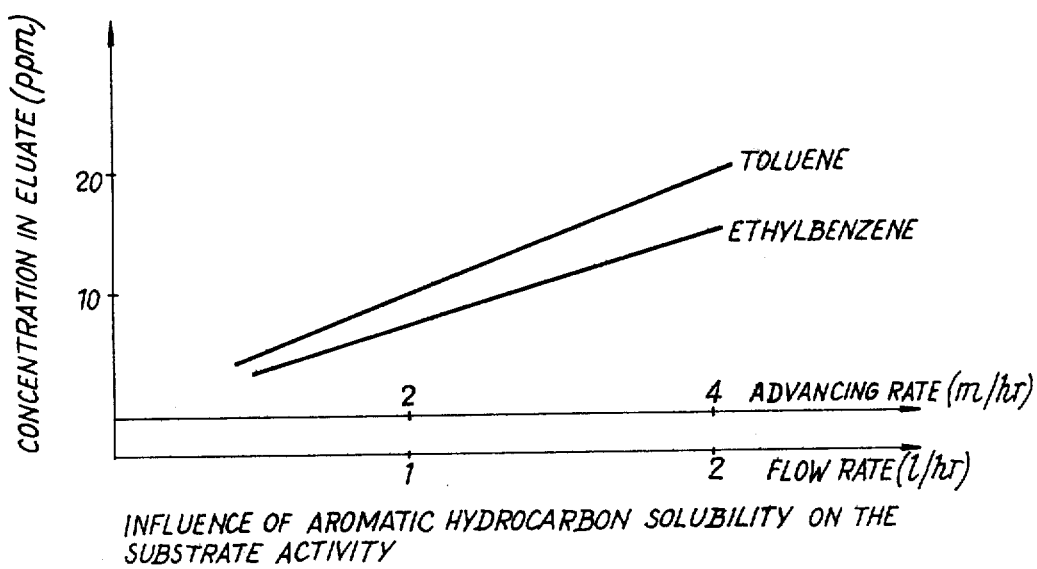

Further features of the invention will be apparent from the ensuing description, taken in connection with the accompanying drawing, in which:

FIG. 1 is a graph of toluene in substrate versus amount of toluene remaining in the eluate of a solution containing 200 ppm of toluene; and FIG. 2 is a graph of concentration in eluate versus influence of aromatic hydrocarbon solubility on the substrate activity.

The solid complex of this invention comprises essentially an inorganic or organic substrate bearing free hydroxyl groups, activated with an acid halide to which is bound a primary amine.

Useful substrates include typically inorganic silicon-containing substrates such as untreated clays, e.g., kaolinite, bentonite or montmorillonite, roasted clays in the form of crushed bricks, glass, e.g., ordinary crushed glass or glass beads, sand, etc.; organic substrates containing free hydroxy groups such as cellulose derivatives, e.g., wood scraps such as wood sawdust, etc., and organic polymers containing free hydroxyl groups, such as basic ion exchange resins, particularly Lewatit M-500 from BAYER, which is a strong basic ion exchange resin of the polystyrene type.

In the case of certain substrates, for example sand or crushed glass, it is preferred that a regeneration of the surface hydroxyl groups by means of an attack with 10% sodium hydroxide at 70°C, or even by means of phosphoric acid under the same conditions, be carried out prior to the activation step.

By the terms "activity" and "activation" as used here is meant that the inert substrate has been modified to make it reactive with respect to an amine function.

Activation of the substrate is conducted by means of an acid halide which is reacted with the substrate. This acid halide is advantageously a cyanuryl halide, preferably cyanuryl chloride, a cyanogen halide, a thionyl halide or a sulfuryl halide, preferably a chloride.

According to one aspect of the invention, this treatment is conducted by suspending the pre-dried substrate in a solution of the acid halide in a suitable solvent. After a sufficient contact time, generally from 2 hours to 8 hours, the activated substrate is separated from the solution, washed with a solvent which is preferably the same as above, to remove any trace of reagent, and is then dried, in vacuo for example.

Chloroform, carbon tetrachloride, hexane and dioxane are non limiting examples of the most convenient solvents for this purpose.

The temperatures used for the activation treatment of the substrate vary generally within a range from 0° to +50°C and are preferably from 10° to 30°C.

The weight ratio of acid halide to substrate may vary within a range of from 0.01:1 to 10:1. For example, in the case of bentonite and sulfuryl chloride, this ratio is preferably within the range from 0.1:1 to 1:1.

An amine is then bound to the thus activated substrate. Suitable amines include saturated or unsaturated primary aliphatic amines containing from 6 to 20 carbon atoms (advantageously 10-20 carbon atoms) and primary aromatic amines having, attached to a phenyl ring, a linear hydrocarbon chain of 1-10 carbon atoms bearing the amine group.

It is thought that the amine is covalently bound to the activated substrate.

The binding of the amine to the dried activated substrate is, according to one aspect of the invention, effected by suspending the substrate in a solution of the amine in an organic solvent which may be the same as that used in the activation step. After sufficient contact me, generally from one to two hours, the complex is separated from the solution, washed with water to remove any trace of amine and is then dried in vacuo. It may then be stored for a long period of time. The temeratures used to effect said binding are within the range from 1° to 50°C; however, room temperature is generally used. The weight ratio of amine to activated substrate may vary within the range of from 0.01:1 to 10:1.

According to another aspect of the invention, complexes based on thermally stable amines may be prepared in vapor phase, in the following manner.

The substrate, optionally previously surface regenerated, washed and dried is introduced in a treatment column in which it is first contacted with vapors of the acid halide.

Activation with the halide may be conducted between 50°C and 400°C; best results, however, are obtained at about the boiling temperature of the halide (70°–100°C in the case of sulfuryl chloride). Contact times of from 2 hours to 4 hours are generally sufficient.

Fixation of the amine occurs then between 100°C and 350°C; however, a temperature between 100°C and 150°C is generally used to prevent substantial thermal decomposition of the amine. Temperature control facilitated either by operating under a partial vacuum, or by use of a binary azeotropic amine-petroleum cut mixture of suitable boiling point.

Contact time is essentially dependent on the operating conditions selected and varies from a few hours to about ten hours and increases when temperature and vapor pressure decrease. However, the lower the operating temperature, the better the quality of the resulting complex.

An inert gas such as air or nitrogen is used as propellant for the materials and for the purpose of flushing the unit between two operations. It is obvious that the use of another inert gas under the aforesaid operating conditions or of another propellant means for the materials is not outside the scope of the invention. By "inert", is meant a gas which does not react with the reactants and the reaction products.

The quality of the products obtained in vapor phase similar to that of the products obtained in solvent phase when identical raw materials are used.

The resulting complex may be used for binding hydrocarbons or other organic materials, typically proteins, fatty alcohols, fatty aldehydes, fatty acids, and the like, contained in fluids, in the form of a solution, an emulsion, a suspension, etc.

The solid complexes of this invention are usefully applicable in the treatment of waters containing hydrocarbons or other organic pollutants. The complexes are readily regenerated by treatment with an organic solvent or by heating, and the hydrocarbons and organic materials bound are readily recovered. When the complexes are formed as columns, these may be used a great number of times.

It was found not only that the complex could be regenerated by treatment with an organic solvent or by heating with steam, but also that the complexes were more thermally stable than their constituent organic compounds. The phenomena may be explained by the length and the relative steric unaccessibility of the covalent activated substrate-amine bond. Temperatures of 300°C have been attained without substantially affecting the quality of the complex.

Said complexes make it also possible to remove fatty alcohols, fatty aldehydes and fatty acids having a lipophilic chain of sufficient size.

Another useful application of the solid complexes of this invention is in the analytical use of columns for gas chromatography comprising said complexes.

Depending on the amine they contain, the solid complexes according to the invention make it possible to separate proteins by elution gradient after binding same to the complexes by means of a hydrophobic linkage, because the proteins will be more or less bound depending on their more or less hydrophobic character.

Binding of hydrocarbons and organic materials to the solid complexes of this invention is effected by contacting complexes with fluids containing the hydrocarbons and the organic materials. This contacting may be conducted by passing the fluid through or on a bed of the complex or by spreading the complex over the surface of the fluid, of the sea-water or of the river-water contaminated with hydrocarbons, for example. In this latter case, the hydrocarbons are carried down with the complex to the bottom of the sea, of the river or of the vessel in which the treatment is carried out.

In the case where the complex carries an aliphatic amine, it will be particularly effective for binding aliphatic hydrocarbons, and in the case where the complex carries an aromatic amine, the complex will preferably bind aromatic hydrocarbons.

Binding of hydrocarbons or aromatic materials to the complex occurs rapidly and contact times may range from a few minutes to five or six hours at most, longer contact times resulting in no increased binding. Preferred contact times, in column form, are within the range from thirty minutes to two hours.

The amount of hydrocarbons bound may vary broadly, and the higher the complex and hydrocarbon concentration the higher the amount bound.

Binding of protein to a substrate-amine complex may be accomplished by suspending the substrate in an aqueous protein solution. The binding temperature is advantageously comprised within a range from 1° to 35°C, and the contact time is preferably from two to three hours.

The practice of this invention is further illustrated by means of the following examples which are not intended to be limitations on the scope of the invention.

COMPARATIVE EXAMPLE

A mixture of commercial bentonite (500 mg) and of a 1% suspension of n-tetradecane in distilled water (20 ml) is added to polyethylene centrifuge tubes of 50 ml capacity.

The hydrocarnon suspension is homogenized by sonication prior to contacting with the bentonite.

The centrifuge tubes are submitted to a vibrational agitation during one hour. The resulting bentonite-hydrocarbon complex is then removed by centrifugation.

Determination of the hydrocarbon by column gas chromatography is carried out on the supernatant. After stirring, only 74% of the original amount of hydrocarbon are found in the supernatant. This result is confirmed by acetone extraction of the hydrocarbon adsorbed on the bentonite which is determined by the same technique.

The results of this example show that untreated bentonite is capable of binding a certain amount of hydrocarbon.

EXAMPLE 1 a. In a first step, binding of cyanuryl chloride to bentonite is effected by suspending the latter in a solution of cyanuryl chloride in dioxane and by stirring the resulting suspension at a temperature of 20°C during one hour.

The reaction is carried out in centrifuge tubes containing each 500 ml of commercial bentonite, 20 ml of dioxane and 50 mg of cyanuryl chloride.

The bentonite thus activated is separated by centrifugation, washed five times by resuspending in dioxane to remove the unreacted cyanuryl chloride and is then dried in vacuo.

b. In a second step, the bentonite-cyanuryl chloride complex obtained as described under (a) is contacted with tetradecylamine. For this purpose, 500 mg of bentonite-cyanuryl chloride complex and 20 ml of a 0.001% solution of tetradecylamine in dioxane are added to centrifuge tubes.

The tubes are agitated during one hour, and excess amine is then removed by washing the complex with 5 × 20 ml of dioxane. The complex is finally washed with 3 × 20 ml of acetone to facilitate drying.

c. A hydrocarbon binding test is carried out with the complex prepared under (b) above. For this purpose, 500 mg of bentonite-cyanuryl chloride and 20 ml of a 1% suspension of n-tetradecane in distilled water are added to centrifuge tubes.

The tubes are agitated during one hour, after which the complex is removed by centrifugation to determine the hydrocarbon content both in the supernatant and in the centrifugation cake after extracting the hydrocarbon with acetone, in the manner described in the preceding Comparative Example.

The supernatant is found to contain only 23% of the original amount of hydrocarbon.

It is apparent, from a comparison of this result with that of the Comparative Example, that the amount of hydrocarbon adsorbed is much higher when the contacting is carried out with the complex of this invention than when it is carried out with bentonite alone.

EXAMPLE 2 a. Bentonite is activated by adding 500 mg of bentonite, 20 ml of dioxane and 2 ml of sulfuryl chloride to centrifuge tubes.

The reaction is allowed to proceed during one hour, after which the resulting material is centrifuged, washed several times by resuspending the centrifugation cake in dioxane and is then dried in vacuo.

b. The activated bentonite obtained under (a) is suspended in a n-tetradecylamine solution, using the procedure described in Example 1.

c. A n-tetradecane binding test is then carried out, and the determinations are carried out as in Example 1.

The supernatant contains only 19% of the original amount of hydrocarbon.

This result is quite comparable with that obtained in Example 1.

EXAMPLE 3

Using the same procedure as in Example 2, tests were carried out, substituting n-dodecylamine or n-octadecylamine for n-tetradecylamine.

Using the $C_{12}$ amine, 80% of the original amount of hydrocarbon are bound.

Using the $C_{18}$ amine, the amount of hydrocarbon bound corresponds to 85% of the original amount of hydrocarbon.

EXAMPLE 4 n-Tetradecane is absorbed on Loire sand having a particle size within the range from 0.9 to 1 mm which has been previously activated and then treated with n-tetradecylamine.

The sand is first treated with 10% NaOH at 75°C during two hours, over a water-bath, to regenerate the surface hydroxyl groups. It is then washed with water and dried in an oven.

The procedure is then identical with that described in Example 2.

The amount of hydrocarbon bound to the sand-amine complex is then equal to 88% of the original hydrocarbon content.

EXAMPLE 5

Dried crushed brick of particle size between 0.8 and 1.0 mm is treated with thionyl chloride in dioxane, as described in Example 2. After washing with dioxane and drying, n-tetradecyl amine is added. The resulting material is washed again, and the hydrocarbon is added thereto, as set forth in Example 2.

The amount of hydrocarbon bound by the brick-amine complex is equal to 87% of the original amount of hydrocarbon.

A column 20 cm high, having a diameter of 3 cm, is prepared with the brick-amine complex. Addition thereto of a 1% aqueous n-tetradecane suspension at a rate of up to 4 m/hr made it possible to remove entirely the hydrocarbons from the solution.

EXAMPLE 6

The hydrocarbon is adsorbed on glass which was ground, screened to a particle size between 0.8 and 1.0 mm and then treated with n-tetradecylamine as described in Example 2.

The procedure used is the same as that described in Example 5.

The amount of hydrocarbon bound to the glass-amine complex is equal to 76% of the original amount of hydrocarbon.

A similar experiment was carried out with glass beads having a diameter from 1 mm to 1.05 mm. The amount of hydrocarbon bound was 56%. The amount bound increases when using glass beads of lesser diameter.

EXAMPLE 7

Lewatit M-500 resin is treated in place of the bentonite, as described in Example 2. The amount of hydrocarbon bound is equal to 77% of the original amount.

EXAMPLE 8

Thoroughly dry sawdust is used as substrate in this example; it is treated with sulfuryl chloride; tetradecylamine is then bound thereto and to 100 mg of sawdust-amine complex are added 20 ml of a 1% hydrocarbon (n-tetradecane) suspension. After a contact time of three hours, the amount of hydrocarbon bound is equal to 23% of the original amount.

EXAMPLE 9 n-Dodecylamine, or n-tetradecylamine, or n-octadecylamine are bound to previously activated bentonite, using the procedure of Example 2.

After the preparation of the bentonite-amine complex, the latter is contacted with a solution containing a mixture of two enzymatic proteins, urease and invertase.

The activity of urease is measured by the determination of the ammonia formed, by means of Nessler's reagent; the activity of invertase is measured by the determination of the amount of reducing sugars formed, by means of the method by Somogyi and Nelson. The overall protein content is determined by the method according to Lowry.

Binding of the proteins to the complex is effected in centrifuge tubes containing 500 mg of bentonite-amine complex, 0.2 mg of the enzyme urease, 0.2 mm of the enzyme invertase and 20 ml of distilled water.

Contact time is two hours.

The results obtained are summarized in following Table I:

TABLE I

| Amines | Proteins bound | Invertase bound | Urease bound |
| --- | --- | --- | --- |
| Dodecylamine | 65% | 6.5% | 86.4% |
| Tetradecylamine | 62.5% | 6.5% | 77.6% |
| Octadecylamine | 61.5% | 13.5% | 84.6% |

These results show that, using the complexes of this invention, it is possible to separate proteins by their differential adsorption ability on a hydrophobic chain.

EXAMPLE 10

This example illustrates the possibility of effecting gas chromatographic analyses of hydrocarbons by means of the complexes of this invention.

Crushed screened (0.177–0.149 mm) brick is treated as in Example 5 to prepare a brick-n-tetradecylamine complex. This complex is introduced into a column having a diameter of 2.54 cm and 2.45 m in length.

A mixture containing eight hydrocarbons (from n-$C_{12}$ to n-$C_{19}$) was most readily separated by means of this column, under programmed temperature conditions from 120°C to 220°C at a rate of 5°C per minute. The quality of the separation is markedly superior to that obtained with a "Chromosorb" (roasted diatomite) column impregnated with 10% SE 30.

This example shows that the complex is able to fix hydrocarbons contained in a gas stream.

EXAMPLE 11

A crushed brick-tetradecylamine complex is prepared as described in Example 10.

This is packed into a column having a diameter of 4 cm and 50 cm in length, and an aqueous petroleum refinery effluent containing 60 ppm of a hydrocarbon mixture is passed through the column.

After a single passage through the column, less than · ppm of hydrocarbon remain in the effluent.

EXAMPLE 12

A crushed brick-tetradecylamine complex is prepared as described in Example 10.

This complex is sprinkled over the surface of the liquid in a transparent glass vessel containing water carrying a surface layer of crude petroleum. It is found that the petroleum is substantially entirely bound to the complex and falls to the bottom of the vessel with the latter.

Following Examples 13 and 14 are given to illustrate that a substrate-aromatic amine complex is more efficient than a substrate-aliphatic amine complex toward an aqueous aromatic hydrocarbons solution.

A brick-n-tetradecylamine complex (1 kg) and a brick-4-phenylbutylamine complex (1 kg) having the same particle size of from 0.8 to 1 mm are prepared according to the procedure of Example 5.

Two columns, 2.5 cm in diameter, containing each about 400 cc of one of the above complexes are then prepared.

EXAMPLE 13

A solution containing 200 ppm toluene in water (toluene is soluble at 200 ppm) is percolated at different rates through both columns.

The toluene remaining in the eluate is then determined by gas chromatographic analysis.

The results obtained are illustrated in FIG. 1 of the accompanying drawing which shows a more substantial adsorption with the n-phenylbutylamine treated complex.

The following results are apparent from the curve, when the solution is percolated at a rate of 4 m/hr: the water is 80% pure after percolation through a n-tetradecylamine based column and is 90% pure after percolation through the same column packed with the 4-phenylbutylamine based complex.

Under the same conditions, the untreated brick removes less than 20% of the dissolved toluene.

EXAMPLE 14

It was shown in Example 5 that a column of complex of this invention is capable of completely removing an insoluble hydrocarbon such as n-tetradecane.

For the purpose of confirming this result, a new experiment was carried out by substituting the toluene with less soluble ethylbenzene: FIG. 2 of the accompanying drawing shows that the solution containing 200 ppm ethylbenzene is more highly purified.

Thus, it is apparent from Examples 13 and 14 that it is more advantageous to use a substrate-aromatic amine complex than a substrate-aliphatic amine complex for the removal of aromatic hydrocarbons from water. The less soluble the hydrocarbon, the better the results obtained.

EXAMPLES 15–23

Examples 15–23 illustrate some gas phase preparations of an inorganic substrate-amine complex.

The complexes were prepared from two basic substrates having a particle size from 1 to 1.3 mm; one of these being screened crushed brick and the other being commercial river sand commonly used in sand filters.

1°. 300 ml washed dried brick are added to a closed vessel heated at temperatures of 160° and 280°C and are swept with sulfuryl chloride vapor during 3 hours. Higher temperatures may be used, but they only lead to a wasteful loss of material.

After heating is discontinued, a nitrogen stream is passed through during two hours to remove any trace of free sulfuryl chloride.

The resulting activated brick is then brought into solvent phase in 2 litres 10% sulfuryl chloride solution in chloroform during 3 hours. The resulting complex is then washed and dried. It is compared, in Table II, with the same brick prepared entirely in solvent phase according to the procedure described in Example 5.

2°. Two samples of previously screened river sand are treated with 10% sodium hydroxide and 10% phosphoric acid, respectively, at 75°C, during 2 hours, over a water-bath, to regenerate the surface hydroxyl groups. They are then washed and dried in an oven.

Both the samples thus prepared together with a third sample of merely washed sand are then activated in vapor phase at 100°C with sulfuryl chloride, as described under 1°. above for the brick.

Amination of the sand samples was effected in vapor phase, using the following boiling tetradecylamine-paraffinic hydrocarbon mixtures:

a. n-tetradecylamine (60%)-n-$C_{14}$ paraffinic hydrocarbon (40%) mixture boiling at 250°C/760 mm Hg, the tetradecylamine partial pressure varying between 100 and 150 mm Hg;

b. n-tetradecylamine (80%)-n-$C_8$ paraffinic hydrocarbon (20%) mixture boiling at 140°C/760 mm Hg, the tetradecylamine partial vapor pressure being 10 mm Hg.

The reactions were allowed to proceed during 3 and 6 hours, respectively.

Adsorption tests were carried out with the resulting complexes. A very fine emulsion of 50 ppm n-tetradecane in water was obtained by sonication during 5 minutes. Micelles having diameters of submicron size and which are maintained as a stable emulsion throughout the test are thus obtained.

10 g of test compound and 50 ml of the prepared emulsion are introduced into a test tube. The tubes are shaken during 15 minutes and the supernatant emulsion is immediately assayed chromatographically. The amount of hydrocarbon bound to the complex is derived therefrom.

The results corresponding to an average particle size of 1.15 mm are set forth in following Table II.

TABLE II

| Ex. No. | Nature of the complex | Amount of hydrocarbon bound (in mg/g of complex) |
|---|---|---|
| 15 | Untreated brick | 0.050 |
| 16 | Brick complex prepared in solvent phase | 0.185 |
| 17 | Gas phase activated brick, at 280°C, aminated in solvent phase | 0.077 |
| 18 | Gas phase activated brick, at 160°C, aminated in solvent phase | 0.195 |
| 19 | Untreated sand | 0.056 |
| 20 | Sand regenerated with sodium hydroxide and then activated at 100°C and aminated at 250°C in vapor phase | 0.105 |
| 21 | Sand regenerated with sodium hydroxide and then activated at 100°C and aminated at 140°C in vapor phase | 0.230 |
| 22 | Unregenerated sand, merely activated at 100°C and aminated at 140°C in vapor phase | 0.093 |
| 23 | Sand regenerated with phosphoric acid, then activated at 100°C and aminated at 140°C in vapor phase | 0.145 |

It is apparent from these Examples that the results obtained with the complexes prepared in vapor phase are comparable with those obtained with the complexes prepared in solvent phase and that the quality of the complex is much less influenced by the nature of the inorganic substrate than by the treatment conditions. In this respect, it should be noted that unduly elevated activation or amination temperatures are detrimental to the quality of the substrate.

Having now described our invention, what we claim as new and desire to secure by Letters Patent is:

1. Solid complex usable for binding hydrocarbons and other organic materials, consisting essentially of a solid substrate bearing free hydroxyl groups activated with 0.01 to 10 parts by weight of an acid halide per one part of said substrate, and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbon atoms bearing the amine group.

2. Complex as claimed in claim 1, wherein said substrate is an inorganic silicon-containing substrate selected from an untreated clay, a crushed roasted clay, crushed glass, glass beads and sand.

3. Complex as claimed in claim 1, wherein said substrate is a cellulosic substrate.

4. Complex as claimed in claim 3, wherein said cellulosic substrate is sawdust.

5. Complex as claimed in claim 1, wherein said substrate is an organic polymer carrying free hydroxy groups.

6. Complex as claimed in claim 1, wherein said acid halide is selected from a cyanuryl halide, a cyanogen halide, a thionyl halide and a sulfuryl halide.

7. Complex as claimed in claim 6, wherein said halide is a chloride.

8. Complex as claimed in claim 1, wherein said primary aliphatic amine contains from 10 to 20 carbon atoms.

9. Process for the preparation of a solid complex consisting essentially of a solid substrate bearing free hydroxyl groups activated with 0.01 to 10 parts by weight of an acid halide per one part of said substrate and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbon atoms bearing the amine group, comprising suspending said solid substrate in a solution of said acid halide in an organic solvent, removing the activated substrate, washing same with an organic solvent, suspending the washed activated substrate in a solution of said amine and isolating the resulting solid complex.

10. Process as claimed in claim 9, wherein said substrate is an inorganic silicon-containing substrate selected from an untreated clay, a crushed roasted clay, crushed glass, glass beads and sand.

11. Process as claimed in claim 9, wherein said substrate is a cellulosic substrate.

12. Process as claimed in claim 9, wherein said substrate is an organic polymer carrying free hydroxy groups.

13. Process as claimed in claim 9, wherein said acid halide is selected from a cyanuryl halide, a cyanogen halide, a thionyl halide and a sulfuryl halide.

14. Process as claimed in claim 9, wherein the activation of the substrate is effected at a temperature from 0° to 50°C.

15. Process as claimed in claim 9, wherein the free hydroxyl groups of the substrate are regenerated prior to activation of the latter with the acid halide.

16. Process for the preparation of a solid complex consisting essentially of a solid substrate bearing free hydroxyl groups activated with 0.01 to 10 parts by weight of an acid halide per one part of said substrate and to which is covalently bound from 0.01 to 10 parts by weight of an amine selected from the primary aliphatic amines having from 6 to 20 carbon atoms and the primary aromatic amines having, attached to a phenyl ring, a linear hydrocarbon chain of 1 to 10 carbons bearing the amine group, comprising contacting said substrate with a vapor of said acid halide, entraining the excess vapors with an inert gas, and then sweeping the activated substrate with a vapor containing said amine and collecting the resulting solid complex.

17. Process as claimed in claim 16, wherein the activation of the substrate is effected at a temperature from 50° to 400°C.

18. Process as claimed in claim 16, wherein the amination of the activated substrate is effected at a temperature from 100° to 350°C.

19. Process as claimed in claim 16, wherein said substrate is an inorganic silicon-containing substrate selected from an untrated clay, a crushed roasted clay, crushed glass, glass beads and sand.

20. Process as claimed in claim 16, wherein said substrate is a cellulosic substrate.

21. Process as claimed in claim 16, wherein said substrate is an organic polymer carrying free hydroxy groups.

22. Process as claimed in claim 16, wherein said acid halide is selected from a cyanuryl halide, a cyanogen halide, a thionyl halide and a sulfuryl halide.

23. Process as claimed in claim 16, wherein the free hydroxyl groups of the substrate are regenerated prior to activation of the latter with the acid halide.

* * * * *